(12) United States Patent
Kamei et al.

(10) Patent No.: US 12,553,667 B2
(45) Date of Patent: Feb. 17, 2026

(54) METHOD FOR MANUFACTURING CERAMIC PRODUCT CONTAINING SILICON CARBIDE

(71) Applicant: NGK INSULATORS, LTD., Nagoya (JP)

(72) Inventors: Yoshiyuki Kamei, Nagoya (JP); Chikashi Ihara, Nagoya (JP); Masato Shimada, Nagoya (JP); Kazuhi Matsumoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 1164 days.

(21) Appl. No.: 16/826,381

(22) Filed: Mar. 23, 2020

(65) Prior Publication Data

US 2020/0309454 A1    Oct. 1, 2020

(30) Foreign Application Priority Data

Mar. 28, 2019    (JP) ................................ 2019-064908

(51) Int. Cl.
*F27B 9/04* (2006.01)
*C04B 35/565* (2006.01)
(Continued)

(52) U.S. Cl.
CPC ............ *F27B 9/045* (2013.01); *C04B 35/565* (2013.01); *C04B 35/645* (2013.01); *C04B 38/0006* (2013.01); *C04B 35/622* (2013.01); *C04B 35/64* (2013.01); *C04B 2111/00793* (2013.01); *C04B 2235/658* (2013.01); *C04B 2235/6586* (2013.01); *F27B 2007/025* (2013.01);
(Continued)

(58) Field of Classification Search
None
See application file for complete search history.

(56) References Cited

U.S. PATENT DOCUMENTS 2,960,744 A * 11/1960 Blank ..................... F27B 9/047
                                                                     264/611
3,807,052 A * 4/1974 Troue ....................... G21K 5/10
                                                         976/DIG. 444

(Continued)

FOREIGN PATENT DOCUMENTS

CN          1969163 A      5/2007
CN       201246955 Y      5/2009

(Continued)

OTHER PUBLICATIONS

Translation of EP-3202480-A1 (Year: 2017).*

(Continued)

*Primary Examiner* — Elizabeth M Kerr
(74) *Attorney, Agent, or Firm* — BURR PATENT LAW, PLLC

(57) ABSTRACT

A method for manufacturing a ceramic product containing silicon carbide, including a step of firing a formed body of a green body containing silicon carbide by transporting the formed body from an inlet to an outlet of a continuous furnace, wherein the continuous furnace includes the inlet, a heating zone, a cooling zone, and the outlet in this order, and a furnace atmosphere in both the heating zone and the cooling zone is an inert gas having an oxygen concentration of 100 ppm by volume or less.

14 Claims, 4 Drawing Sheets

(51) Int. Cl.
*C04B 35/64* (2006.01)
*C04B 35/645* (2006.01)
*C04B 38/00* (2006.01)
*F27B 7/02* (2006.01)
*F27D 9/00* (2006.01)
*F27D 19/00* (2006.01)
*C04B 35/622* (2006.01)
*C04B 111/00* (2006.01)

(52) U.S. Cl.
CPC ............... *F27D 2009/0078* (2013.01); *F27D 2019/0006* (2013.01)

(56) References Cited

U.S. PATENT DOCUMENTS

| | | | | |
|---|---|---|---|---|
| 5,289,968 | A * | 3/1994 | Maeda | B23K 1/19 228/262.5 |
| 2004/0057816 | A1* | 3/2004 | Nunemacher | F23G 5/027 414/217 |
| 2006/0029897 | A1 | 2/2006 | Saijo et al. | |
| 2006/0029898 | A1 | 2/2006 | Saijo et al. | |
| 2006/0118546 | A1* | 6/2006 | Saijo | H05B 3/141 219/542 |
| 2007/0001349 | A1 | 1/2007 | Muroi et al. | |
| 2010/0213648 | A1* | 8/2010 | Ohki | F27B 9/04 266/252 |
| 2014/0030667 | A1* | 1/2014 | Woods | B23K 28/003 432/120 |
| 2017/0348641 | A1 | 12/2017 | Rodrigues et al. | |
| 2018/0265419 | A1 | 9/2018 | Ihara et al. | |

FOREIGN PATENT DOCUMENTS

| | | | |
|---|---|---|---|
| EP | 3202480 A1 * | 8/2017 | ............ F01N 3/022 |
| JP | H09-012368 A | 1/1997 | |
| JP | 2004-292197 A1 | 10/2004 | |
| JP | 2007-254237 A1 | 10/2007 | |
| JP | 2018-505771 A | 3/2018 | |
| JP | 2018-154536 A1 | 10/2018 | |
| WO | 2006/013652 A1 | 2/2006 | |

OTHER PUBLICATIONS

Chinese Office Action (Application No. 202010199305.5) dated Feb. 10, 2022 (with English translation).

Japanese Office Action (with English translation) dated Sep. 6, 2022 (Application No. 2019-064908).

German Office Action (with English translation) dated Feb. 16, 2024 (Application No. 10 2020 001 816.5).

* cited by examiner

METHOD FOR MANUFACTURING CERAMIC PRODUCT CONTAINING SILICON CARBIDE

FIELD OF THE INVENTION

The present invention relates to a method for manufacturing a ceramic product containing silicon carbide. In particular, the present invention relates to a method for manufacturing a honeycomb structure used as a filter or a catalyst carrier for purifying automobile exhaust gas among silicon carbide-containing ceramic products.

BACKGROUND OF THE INVENTION

Silicon carbide (SiC), taking advantage of its properties such as high heat resistance, high hardness, excellent chemical resistance, and excellent abrasion resistance, has been used for various ceramic products such as heat sinks, exhaust gas filters, catalyst carriers, sliding parts, nozzles, heat exchangers, and parts for equipment for manufacturing semiconductors. Especially, a Si-impregnated SiC material in which a silicon carbide porous body is impregnated with metallic silicon has an application as a heat sink material due to its excellent thermal conductivity. Further, a Si-bonded SiC material in which silicon carbide particles are bonded by metallic silicon has characteristics of excellent heat resistance, thermal shock resistance, and oxidation resistance, and is known as a typical constituent material of a honeycomb structure used for a filter for trapping fine particles in exhaust gas of an internal combustion engine, a boiler or the like, or used for a catalyst carrier of an exhaust gas purifying catalyst, and the like.

Ceramic products containing silicon carbide can be manufactured, for example, by adding a metallic silicon, an organic binder, and an alkaline earth metal to a silicon carbide power raw material; mixing and kneading the materials to obtain a green body; forming the green body into a predetermined shape; calcining the formed body to remove the organic binder in the formed body; and thereafter firing the formed body. At the stage of the firing, the formed body can be placed in a kiln tool (a kiln material and a sagger, or the like) and fired in an Ar gas atmosphere, thereby realizing (or improving) product characteristics.

Japanese Patent Publication No. 2007-254237 (Patent Literature 1) discloses a method for manufacturing Si-containing non-oxide ceramic body containing Si as an element, comprising forming a green body obtained from a material containing a metallic silicon and an organic binder into a predetermined shape, placing the obtained formed body in a sagger that has a slit for gas flow; calcining to remove the organic binder in the formed body; firing at a temperature of 1600° C. or lower in an atmosphere of an inert gas such as $N_2$ or Ar.

Japanese Patent Publication No. 2004-292197 (Patent Literature 2) discloses a method for manufacturing a honeycomb structure, comprising adding a raw material containing a metallic silicon, an organic binder, and an alkaline earth metal to a silicon carbide power raw material; mixing and kneading the materials to obtain a green body; forming the green body into a predetermined shape; calcining the formed body to remove the organic binder in the formed body; and thereafter firing the formed body; characterized in that during the calcining and the firing, at least the firing is performed by placing a solid containing aluminum as a component in a silicon carbide based kiln material. Patent Literature 2 describes that the firing is performed in an inert atmosphere such as Ar.

Japanese Patent Publication No. 2018-154536 (Patent Literature 3) discloses a method for manufacturing a silicon carbide based honeycomb structure, comprising a firing step of introducing an extrusion molded honeycomb formed body containing an silicon carbide based component together with a firing member into a firing furnace and firing to manufacture a silicon carbide based honeycomb structure, wherein the firing member is formed using a ceramic material having an alumina content of 70 wt % or more, and the firing step further comprises an inert gas supply step of supplying an inert gas to a furnace space of the firing furnace and a gas addition step of adding a reducing gas to the furnace space.

According to Patent Literature 3, the firing member may further comprise a shelf plate on which the honeycomb formed body is placed, and a frame body, on which the honeycomb formed body is placed up and down, surrounding the honeycomb formed body placed on the shelf plate. Further, the reducing gas functions as a so-called "oxygen getter", reacting with an oxygen component remaining in the furnace space during the firing step, and can bring the furnace space into a stable low oxygen state. Thereby, the furnace interior space can be maintained in a low oxygen state, and a honeycomb segment of stable quality can be manufactured without biasing the firing conditions of the honeycomb formed body.

CITATION LIST

Patent Literature

[Patent Literature 1] Japanese Patent Publication No. 2007-254237

[Patent Literature 2] Japanese Patent Publication No. 2004-292197

[Patent Literature 3] Japanese Patent Publication No. 2018-154536

SUMMARY OF THE INVENTION

As described above, the firing step (final firing) when manufacturing a ceramic product containing silicon carbide has been performed in an inert gas atmosphere with a formed body placed in a kiln tool (a kiln material and a sagger and the like). It is also known that in the firing step, the quality of the product is controlled by reducing the oxygen concentration in the furnace.

Atmosphere control in the firing step can be performed relatively easily in a batch furnace, and product quality control is also possible. However, in a continuous furnace, even if the atmosphere is controlled in the firing step by the above-described methods, when the work is placed in a place that is easily affected by the atmosphere in the furnace (for example, near the outer periphery of the kiln tool), problems such as a decrease in the strength of the fired body, a deterioration of the pore characteristics (specifically, a decrease in the pore diameter), and discoloration have occurred. It has been found that this problem is particularly remarkable as the porosity of the ceramic product containing silicon carbide is higher. For this reason, a dead space is generated in the kiln tool, and the area where the formed body can be placed is reduced, resulting in a decrease in production efficiency.

The present invention has been made in view of the above circumstances, and in one embodiment an object of the present invention is to provide a method for producing a ceramic product containing silicon carbide using a continuous furnace, which contributes to an improvement in production efficiency.

The present inventors investigated into the oxygen concentration distribution in the furnace in order to find the cause of the above problem. As a result, it has been found that the oxygen concentration in the cooling zone was about 150 ppm by volume, and the oxygen concentration was slightly higher than that in the heating zone. This is considered to be because the cooling pipe for indirect cooling penetrates the furnace wall in the cooling zone, and it is difficult to secure the sealing property between the cooling pipe and the furnace wall. Considering that the fired product is hardly oxidized in the cooling zone, which is a low temperature zone, it can be said that an oxygen concentration of about 150 ppm by volume is a sufficiently low oxygen condition. However, according to the study results of the present inventors, it has been found that by more strictly controlling the oxygen concentration in the cooling zone, the area where the formed article can be placed in the kiln tool can be significantly expanded. The present invention has been created based on this finding, and is exemplified as below.

[1]

A method for manufacturing a ceramic product containing silicon carbide, comprising a step of firing a formed body of a green body containing silicon carbide by transporting the formed body from an inlet to an outlet of a continuous furnace, wherein the continuous furnace comprises the inlet, a heating zone, a cooling zone, and the outlet in this order, and a furnace atmosphere in both the heating zone and the cooling zone is an inert gas having an oxygen concentration of 100 ppm by volume or less.

[2]

The method for manufacturing a ceramic product containing silicon carbide according to [1], wherein a flow rate of the inert gas supplied to the continuous furnace is 1 Nm$^3$/hr or less per 1 m$^3$ of a furnace volume.

[3]

The method for manufacturing a ceramic product containing silicon carbide according to [1] or [2], wherein the cooling zone comprises
at least one through hole formed in a furnace wall and connecting an outside of the furnace and an inside of the furnace; and
at least one cooling pipe inserted into the through hole, a gap between the through hole and the cooling pipe being sealed by at least one rubber ring.

[4]

The method for manufacturing a ceramic product containing silicon carbide according to any one of [1] to [3], wherein the heating zone comprises
at least one through hole formed in a furnace wall and connecting an outside of the furnace and an inside of the furnace and
at least one rod-shaped heater inserted into the through hole, a gap between the through hole and the rod-shaped heater being sealed by at least one rubber ring.

[5]

The method for manufacturing a ceramic product containing silicon carbide according to [3] or [4], wherein the rubber ring is made of fluoro rubber or silicone rubber.

[6]

The method for manufacturing a ceramic product containing silicon carbide according to any one of [1] to [5], wherein the formed body of the green body further comprises silicon.

[7]

The method for manufacturing a ceramic product containing silicon carbide according to any one of [1] to [6], wherein the formed body of the green body comprises a pillar-shaped honeycomb structure having an outer peripheral side wall and partition walls disposed inside the outer peripheral side wall, the partition walls defining a plurality of cells which form flow paths for a fluid from one end face to another end face of the pillar-shaped honeycomb structure.

[8]

The method for manufacturing a ceramic product containing silicon carbide according to any one of claims 1 to 7, wherein a porosity of the ceramic product containing silicon carbide is 45% or more.

[9]

The method for manufacturing a ceramic product containing silicon carbide according to any one of [1] to [7], wherein a furnace pressure in the heating zone and the cooling zone is higher than an atmospheric pressure outside the furnace.

[10]

A sealing method for reducing an oxygen concentration in a furnace, comprising:
preliminarily, a step of inspecting a leak of an inert gas in a continuous furnace from a furnace wall with a leak detector, and when the leak of the inert gas is detected by the leak detector, a step of performing a seal to prevent air from an outside of the furnace from flowing into an inside of the furnace at a leak location; and
thereafter, performing a method for manufacturing a ceramic product containing silicon carbide, comprising a step of firing a formed body of a green body containing silicon carbide by transporting the formed body from an inlet to an outlet of the continuous furnace, wherein the continuous furnace comprises the inlet, a heating zone, a cooling zone, and the outlet in this order, and an atmosphere in the furnace is an inert gas atmosphere.

[11]

The sealing method for reducing an oxygen concentration in a furnace according to [10], wherein the step of inspecting the leak of the inert gas in the furnace from the furnace wall with the leak detector is at least performed on a location where there is a component inserted into a through hole formed on the furnace wall and connecting the outside and inside of the furnace.

[12]

The sealing method for reducing an oxygen concentration in a furnace according to [10] or [11], wherein the step of performing the seal comprises using a rubber ring.

According to one embodiment of the present invention, in a continuous furnace, when a work is placed in a place that is easily affected by the atmosphere in the furnace (for example, near the outer periphery of the kiln tool), the decrease in the strength of the fired body, the deterioration of the pore characteristics, and the discoloration can be suppressed. For this reason, the area of the work (that is, the formed body of the green body containing silicon carbide) that can be placed in the kiln tool can be enlarged, and the production efficiency can be improved.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

<1. Entire Configuration of Continuous Furnace>

Figure 1:
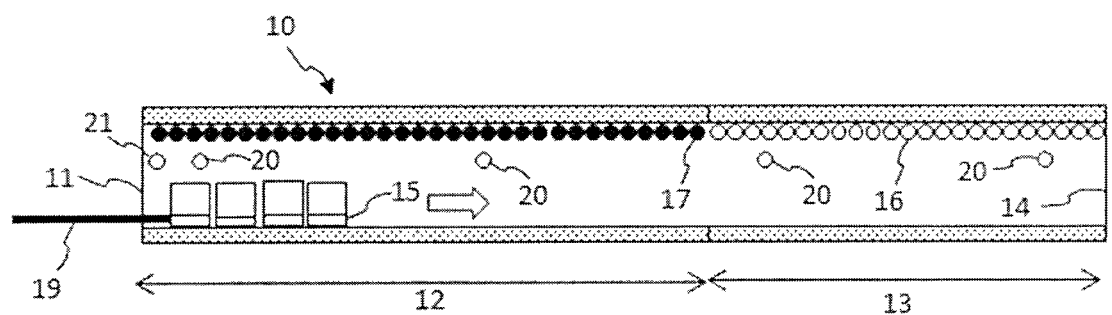
FIG. 1 is a schematic diagram showing an entire configuration of a continuous furnace according to one embodiment of the present invention.

FIG. 1 is a schematic diagram showing an entire configuration of a continuous furnace (10) according to one embodiment of the present invention. The continuous furnace (10) according to the present embodiment comprises an inlet (11), a heating zone (12), a cooling zone (13), and an outlet (14) in this order, and is capable of transporting a work (here, a formed body of a green body containing silicon carbide) loaded on a base plate (15) from the inlet (11) to the outlet (14) while performing heating treatment on the work. The continuous furnace (10) in the present embodiment is a pusher kiln, and the work loaded on the base plate (15) is transported by pressing the base plate (15) with a hydraulic pusher (19).

The heating zone (12) refers to the range in a work traveling direction from the inlet (11) of the continuous furnace (10) to a heater (17) provided at a position closest to the outlet (14) for heating the inside of the furnace. The cooling zone (13) refers to a range in the work traveling direction from immediately after the heater (17) provided closest to the outlet (14) to the outlet (14) of the continuous furnace (10). A cooler (16) can be provided in the cooling zone (13). The concept of "heating" includes "firing". It is also possible to provide a "preheating zone", in which the binder is removed, in the heating zone (12).

To increase the productivity, kiln tools for placing a large number of works can be used. In one embodiment, the kiln tool can be made of ceramics, for example, ceramics containing one or two more selected from the group consisting of silicon carbide (SiC), silicon carbide containing silicon nitride ($Si_3N_4$—SiC), and alumina ($Al_2O_3$) can be used. The kiln tool can be formed in a tower shape by repeatedly stacking shelves on which a plurality of honeycomb formed bodies can be placed.

Figure 3:
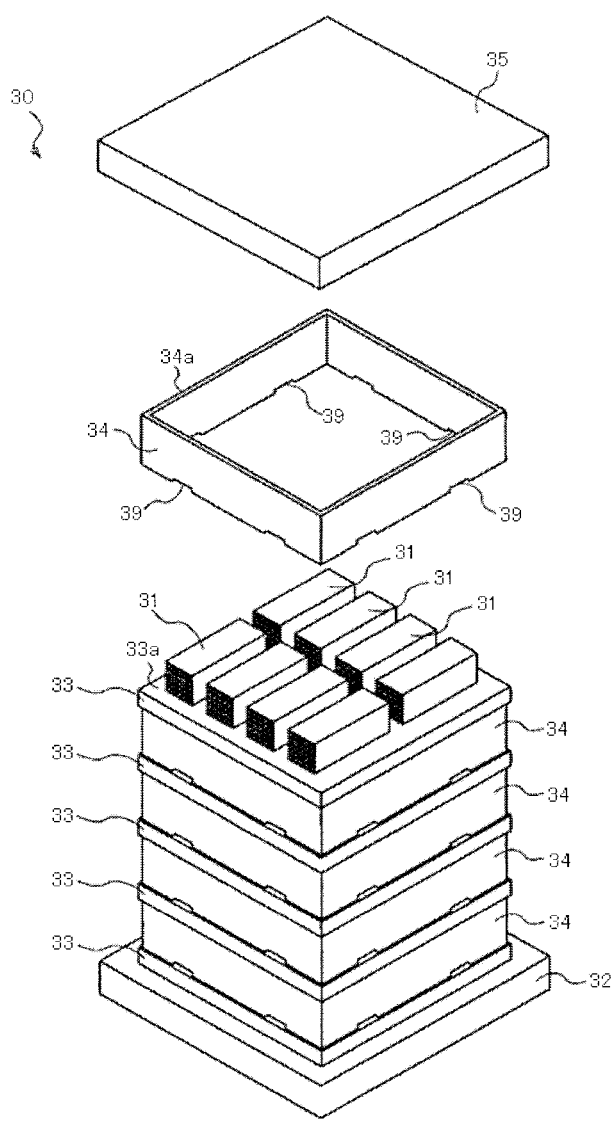
FIG. 3 is a schematic exploded perspective view showing an exemplary structure of a kiln tool.

FIG. 3 shows an exemplary structure according to one embodiment of the kiln tool (30). A method for manufacturing the kiln tool (30) according to the illustrated embodiment will be described. A rectangular shelf plate (33) is placed on a flat base plate (32) arranged at the lowermost position, and a plurality of works (31) is placed in an aligned state on the shelf plate surface (the upper surface) (33a) of the shelf plate (33). Thereafter, a rectangular tubular frame body (34) formed with a frame height higher than the height of the works (31) is placed on the shelf plate surface (33a) so as to surround the placed works (31). Thereafter, a new shelf plate (33) is placed on the upper surface (34a) of the placed frame body (34). This operation is repeated, and a top plate (35) is put on the upper surface (34a) of the uppermost frame body (34), and thereby a tower-shaped kiln tool (30) in which shelves (33) are stacked in multiple stages is produced. In the lower surface of the frame body (34), notches (39) through which the furnace gas can flow are provided at two locations on each side.

There are no particular restrictions on the type of continuous furnace. The illustrated continuous furnace is a pusher kiln, but may be, for example, a tunnel kiln or a roller hearth kiln. Further, the continuous furnace used in the present embodiment is an atmosphere furnace, and the atmosphere in the furnace in the heating zone and the cooling zone can be an inert gas atmosphere having an oxygen concentration of 100 ppm by volume or less. Thereby, oxidation is significantly suppressed even for the works near the outer periphery of the kiln tool. For this reason, it is possible to suppress the decrease in strength of the fired body of the works near the outer periphery of the kiln tool, the deterioration of pore characteristics and discoloration, and it is possible to increase the area of the work that can be placed in the kiln tool, thereby leading to improvement of production efficiency.

The oxygen concentration in the furnace is preferably 50 ppm by volume or less, more preferably 40 ppm by volume or less, even more preferably 30 ppm by volume or less, and most preferably 20 ppm by volume or less, in both the heating zone and the cooling zone. Although no lower limit is set for the oxygen concentration in the furnace, in both the heating zone and the cooling zone, it can be set to 1 ppm by volume or more, and even if the concentration is set to 3 ppm or more, a sufficient oxidation suppressing effect can be obtained.

As the inert gas constituting the atmosphere in the furnace, a rare gas such as an argon gas may be used. By using an inert gas, it is possible to prevent the work from causing an unintended chemical reaction such as oxidation. It is desirable not to use nitrogen as the furnace atmosphere in order to prevent nitriding of the work.

Referring again to FIG. 1, the inlet (11) and the outlet (14) are provided with airtight shutters that can be opened and closed airtightly between the inside and outside of the furnace, respectively. In addition, a supply port (20) and a discharge port (21) of an inert gas are provided in the furnace, and the inert gas introduced into the furnace from the supply ports (20) flows through the furnace, and then discharged from the discharge ports (21).

In order to suppress the contamination of air from outside the furnace, it is preferable to flow an inert gas into the furnace so that the pressure in the furnace in the heating zone and the cooling zone is higher than the atmospheric pressure outside the furnace. Specifically, the furnace pressure in the heating zone and the cooling zone is preferably +10 Pa or more, more preferably +30 Pa or more, and even more preferably +50 Pa or more with respect to the atmospheric pressure outside the furnace. There is no particular upper limit for the pressure in the heating zone and the cooling zone. However, if the pressure in the furnace is too high, the cost increases. Therefore, the pressure in the furnace in the heating zone and the pressure in the cooling zone are preferably +500 Pa or less, more preferably +300 Pa or less, and even more preferably +100 Pa or less with respect to the atmospheric pressure outside the furnace.

If the pressure inside the furnace is higher than the pressure outside the furnace, the inflow of air from outside the furnace should theoretically not occur. However, according to the study results of the present inventors, it is difficult to sufficiently reduce the oxygen concentration in the furnace within an economical range of the amount of argon used. In order to sufficiently reduce the oxygen concentration in the furnace, it is desirable that a leak of the inert gas in the furnace from the furnace wall be inspected by a leak detector in advance. The step of inspecting the leak of the inert gas from the furnace wall of the furnace with the leak detector should at least be performed on a portion of the furnace wall where there is a component inserted into a through hole connecting the outside of the furnace and the inside of the furnace. When inspecting the leak of the inert gas in the furnace from the furnace wall with the leak detector, as described above, it is preferable to perform the inspection in a state where the furnace pressure is higher than the outside pressure of the furnace, and it is more preferable to perform the inspection under conditions that the pressure in the furnace corresponds to the actual operating condition. Further, the inspection is preferably performed in a state where the continuous furnace is heated, and more preferably in a state where a heat curve corresponding to the actual operating conditions is formed.

When leakage of the inert gas is detected by the leak detector, it is desirable to thoroughly seal the leakage location to prevent air from outside the furnace from flowing into the furnace. As a sealing method, for example, a method of fitting a rubber ring to a place where there is a component inserted into a through hole connecting the outside of the furnace and the inside of the furnace can be mentioned. It is also possible to apply a sealant such as a silicone sealant to the leakage location. Since a rubber ring and a silicone sealant have elasticity, they can follow the expansion and contraction of the component due to the temperature change. Thereby, the airtightness can be maintained irrespective of the temperature change in the furnace. In the case of a continuous furnace, especially in a large continuous furnace such as a mass production equipment, the number of components increases and the furnace structure tends to be complicated, but by using an elastic sealant, the sealing structure can be simplified.

The type of the leak detector is not particularly limited. For example, a leak detector using a difference in thermal conductivity from air can be used. It is desirable that the leak detector have a performance capable of detecting an inert gas (for example, argon) of $1.0 \times 10^{-4}$ atm·cc/sec or more as a detection lower limit.

Figure 4:
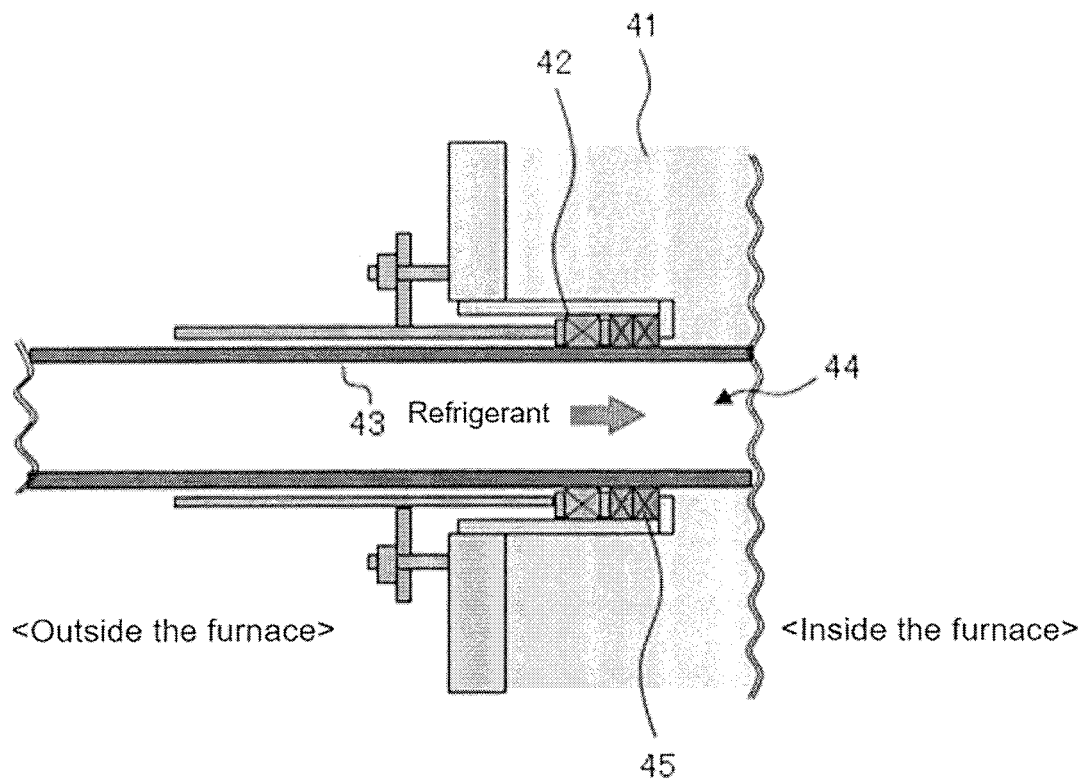
FIG. 4 is a schematic diagram for explaining a cross-sectional structure of a place where a cooling pipe is inserted into a furnace wall.

Referring to FIG. 4, in one embodiment, the cooling zone comprises at least one through hole (44) formed in the furnace wall (41) and connecting the outside of the furnace and the inside of the furnace, and at least one cooling pipe (43) inserted through the through hole (44). Each cooling pipe (43) can be configured to enter from one side of the furnace wall (41), pass through the furnace, and exit from the other side of the furnace wall (41). A refrigerant can flow through the cooling pipe (43), so that the inside of the furnace can be indirectly cooled. By arranging a plurality of cooling pipes (43) in parallel in the furnace length direction, and by adjusting the flow rate and the temperature of the refrigerant flowing through each cooling pipe (43), a desired heat curve can be obtained in the cooling zone. As the refrigerant, for example, air, water, water vapor, chlorofluorocarbons and the like can be used. Among them, air is preferred for the reasons that it is inexpensive, and does not require storage equipment or a heater and the like, and disposal of the refrigerant after use is also easy. The gap between the through hole (44) and the cooling pipe (43) is preferably sealed by at least one rubber ring (42). Thereby, even if the cooling pipe is made of ceramics, the airtightness of the location where the cooling pipe passes through the furnace wall can be easily secured. When one rubber ring (42) is not enough, it is preferable to install a plurality of rubber rings until the leakage by the leak detector disappears. At the gap between the through hole (44) and the cooling pipe (43), in addition to the rubber ring, another sealing member, for example, a heat resistant rope (45) braided with synthetic fibers, can be used.

Specific materials that can be used for the rubber ring used for the cooling zone include, but are not limited to, fluorine rubber, silicone rubber, epichlorohydrin rubber, ethylene-vinyl acetate rubber, acrylic rubber, butyl rubber, ethylene-propylene rubber, chlorosulfonated polyethylene rubber, and the like. Among these, fluorine rubber and silicone rubber are preferred because of their high heat resistance, and fluorine rubber is more preferable in terms of excellent airtightness.

The heat resistance of the rubber ring used for the cooling zone is preferably such that the heat resistance category specified in JIS K6380: 2014 is in the range of D to K, more preferably in the range of E to K, and even more preferably in the range of F to K.

Figure 5:
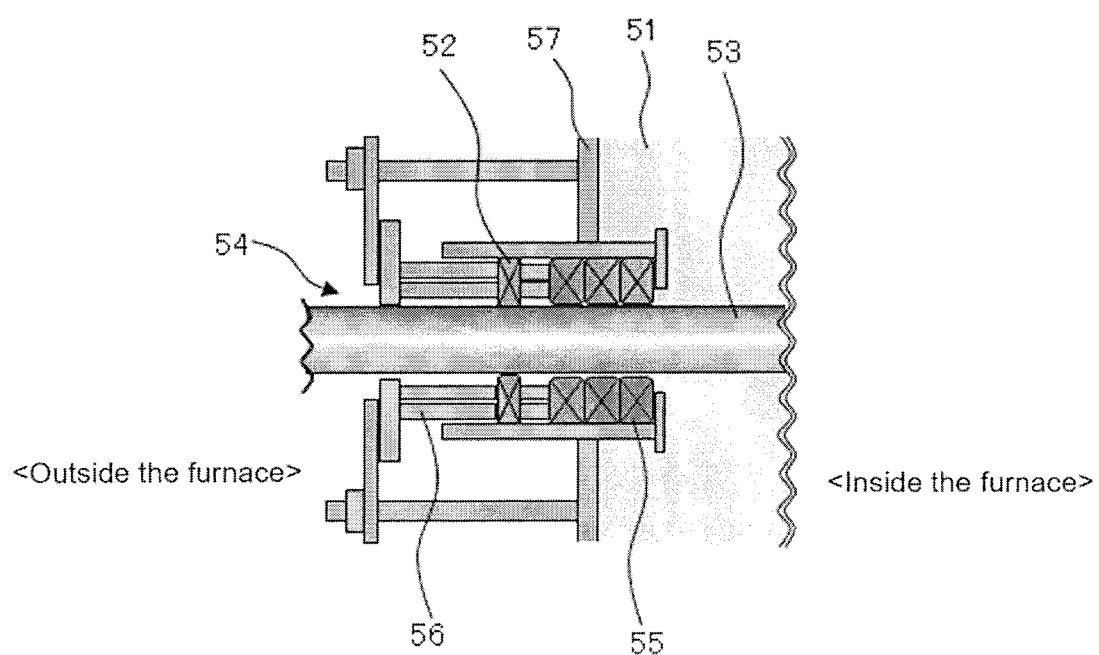
FIG. 5 is a schematic diagram for explaining a cross-sectional structure of a portion where a rod-shaped heater is inserted into a furnace wall.

Referring to FIG. 5, in one embodiment, the heating zone comprises at least one through hole (54) formed in the furnace wall (51) and connecting the outside of the furnace and the inside of the furnace, and at least one rod-shaped heater (53) inserted through the through hole (54). The rod-shaped heater (53) is ordinarily of an electrothermal type. In the heating zone, by arranging a plurality of rod-shaped heaters (53) in parallel in the furnace length direction, and by adjusting the output of each heater, a desired heat curve can be obtained in the heating zone. The gap between the through hole (54) and the rod-shaped heater (53) is preferably sealed by at least one heat resistant rubber ring (52). When one heat resistant rubber ring (52) is not enough, it is preferable to install a plurality of rubber rings until the leakage by the leak detector disappears. At the gap between the through hole (54) and rod-shaped heater (53), in addition to the rubber ring, another sealing member, for example, a heat-resistant rope (55) braided with synthetic fibers, can be used. Further, in the heating zone, to electrically insulate the rod-shaped heater (53) and the can body (57), a cylindrical insulant (56) may be fitted into the gap between the through hole (54) and the rod-shaped heater (53).

As the material of the rubber ring used for the heating zone, heat resistant rubber is preferable. In the present invention, the heat resistant rubber refers to a rubber having a heat resistant category in the range of E to K specified in JIS K6380: 2014, and it is more preferable to use a heat resistant rubber in the range of F to K. As a specific material of the rubber ring used for the heating zone, fluorine rubber and silicone rubber are preferable, and fluorine rubber is more preferable in terms of excellent airtightness.

<2. Ceramic Product Containing Silicon Carbide>

According to one embodiment of the present invention, there is provided a method for manufacturing a ceramic product containing silicon carbide, comprising a step of firing a formed body of a green body containing silicon carbide by transporting the formed body from the inlet to the outlet of the above-described continuous furnace.

The formed body can be produced, for example, by adding water to a raw material mixture containing silicon carbide powder and a binder, kneading to form a green body, forming by various forming methods, and further drying. Further, the formed body of the green body containing silicon carbide may be in the form of a degreased body obtained by drying and then removing organic substances such as a binder by heating.

From the viewpoint of increasing the packing density of the raw material mixture, the average particle diameter of the silicon carbide particles constituting the silicon carbide powder is preferably 1 μm or more, more preferably 5 μm or more, and even more preferably 10 μm or more. In addition, from the viewpoint of enhancing the formability, the average particle diameter of the silicon carbide particles constituting the silicon carbide powder is preferably 1,000 μm or less, more preferably 500 μm or less, and even more preferably 100 μm or less. In the present invention, the average particle diameter of silicon carbide particles refers to an arithmetic average diameter on a volume basis when a frequency distribution of particle sizes is measured by a laser diffraction method.

For the reason of increasing the strength of the sintered body, the concentration of the silicon carbide powder in the raw material mixture is preferably 50% by mass or more, more preferably 60% by mass or more, and even more preferably 70% by mass or more. In addition, for the reason of enhancing the shape retaining ability of the formed body, the concentration of the silicon carbide powder in the raw material mixture is preferably 98% by mass or less, more preferably 96% by mass or less, and even more preferably 94% by mass or less.

By mixing metallic silicon powder into the raw material mixture, a composite material of silicon and silicon carbide can be obtained. When metallic silicon powder is blended, for the reason that mechanical strength can be significantly increased, the amount of metallic silicon powder is preferably 10% by mass or more, more preferably 15% by mass or more, even more preferably 20% by mass or more, with respect to the total of the mass of silicon carbide powder and the mass of metallic silicon powder. In addition, when metallic silicon powder is blended, for the reason of enhancing the shape retaining ability of the formed body, the amount of metallic silicon powder is preferably 40% by mass or less, more preferably 35% by mass or less, even more preferably 30% by mass or less, with respect to the total of the mass of silicon carbide powder and the mass of metallic silicon powder.

Examples of the binder include, but are not limited to, methylcellulose, hydroxypropylmethylcellulose, hydroxypropoxylcellulose, hydroxyethylcellulose, carboxymethylcellulose, and polyvinyl alcohol. Among these, it is preferable to use methylcellulose and hydroxypropoxylcellulose in combination, because the drying shrinkage is small and dimensional control is easy.

For the reason of enhancing the shape retaining ability of the formed body, the concentration of the binder in the raw material mixture is preferably 2% by mass or more, more preferably 4% by mass or more, and even more preferably 6% by mass or more. In addition, from the viewpoint of ease of forming, the concentration of the binder in the raw material mixture is preferably 18% by mass or less, more preferably 14% by mass or less, and even more preferably 12% by mass or less.

A pore-forming agent may be blended in the raw material mixture. For example, when the ceramic product containing silicon carbide is used as an exhaust gas filter, a pore-forming agent can be blended into the raw material mixture for the purpose of increasing the porosity. The compounding amount of the pore-forming agent can be, for example, 30 parts by mass or less with respect to 100 parts by mass of the total amount of the silicon carbide powder and the metallic silicon powder.

The type of the pore-forming agent to be used is not particularly limited, but graphite, foamed resin, foamed resin after foaming, wheat flour, starch, phenolic resin, polymethyl methacrylate, polyethylene, polymethacrylate, polyethylene terephthalate, and the like can be mentioned. The pore-forming agent may be used alone or in combination of two or more.

An alkaline earth metal may be added to the raw material mixture in order to improve the wettability of the metallic silicon during firing. The compounding amount of the alkaline earth metal can be, for example, 5 parts by mass or less with respect to 100 parts by mass of the total amount of the silicon carbide powder and the metallic silicon powder. The kind of the alkaline earth metal to be used is not particularly limited, but specifically calcium and strontium can be mentioned. The alkaline earth metals may be used alone or in combination of two or more.

In order to enable kneading, the ratio of water added to the raw material mixture is preferably 5 parts by mass or more, more preferably 7.5 parts by mass or more, and even more preferably 10 parts by mass or more with respect to 100 parts by mass of the raw material mixture. In addition, for the reason of enhancing the shape retaining ability of the formed body, the ratio of water added to the raw material mixture is preferably 40 parts by mass or less, more preferably 35 parts by mass or less, and even more preferably 30 parts by mass with respect to 100 parts by mass of the raw material mixture.

The method for forming the green body is not limited, and examples include: press forming, extrusion forming, injection forming, and tape forming. For example, when manufacturing a honeycomb formed body using extrusion forming, by extruding the green body, it is possible to manufacture a formed body comprising a pillar-shaped honeycomb structure having an outer peripheral side wall and partition walls disposed inside the outer peripheral side wall, the partition walls defining a plurality of cells which form flow paths for a fluid from one end face to another end face of the pillar-shaped honeycomb structure.

At the time of extrusion forming, a die having a desired overall shape, cell shape, partition wall thickness, cell density, or the like can be used. Next, the obtained undried formed body is dried to remove the water. Drying can be performed, for example, by blowing hot air of about 120 to 160° C. on the formed body. It is desirable to keep in mind that organic matter is not decomposed during drying.

The shape of the cell in a cross section orthogonal to the cell flow path direction is not limited, but is preferably a quadrangle, a hexagon, an octagon, or a combination thereof. Among these, square and hexagon are preferred. By setting the cell shape in this manner, it is possible to reduce the pressure loss when a gas flows through the honeycomb formed body after firing.

The shape of the honeycomb formed body is, for example, a pillar shape having a circular end face (cylindrical shape), a pillar shape having an oval-shaped end face, or a pillar shape having a polygonal end face (quadrangular, pentagonal, hexagonal, heptagonal, octagonal, and the like). As to the size of the honeycomb formed body, for example, in the case of a quadrangular prism, the end face area can be set to 100 mm$^2$ to 2500 mm$^2$, and typically can be set to 1200 mm$^2$ to 2000 mm$^2$. In addition, the length (height) of the cells of the honeycomb formed body in the flow path direction can be set to, for example, 30 to 500 mm, and typically can be set to 100 to 350 mm.

The formed body after drying may be subjected to a step of removing organic substances such as a binder by heating to obtain a degreased body (a degreasing step). From the viewpoint of the easiness of burning the binder, the heating temperature of the formed body in the degreasing step is preferably 300° C. or higher, more preferably 350° C. or higher, even more preferably 400° C. or higher. However, in order to suppress the manufacturing cost at the time of degreasing, the heating temperature of the formed body in the degreasing step is preferably 600° C. or lower, more preferably 550° C. or lower, and even more preferably 500° C. or lower.

From the viewpoint of the easiness of burning of the binder, the heating time at the above-mentioned heating temperature is preferably 1 hour or more, more preferably 2 hours or more, even more preferably 3 hours or more. In order to suppress the manufacturing cost at the time of degreasing, the heating time at the above-mentioned heating temperature is preferably 10 hours or less, more preferably 8 hours or less, and even more preferably 6 hours or less.

The atmosphere for performing the degreasing step may be, for example, an air atmosphere, an inert atmosphere, or a reduced pressure atmosphere. Among them, the inert atmosphere and the reduced pressure atmosphere are preferable from the viewpoints of preventing insufficient sintering due to oxidation of the raw material and easily reducing the oxides contained in the raw material. However, when the degreasing step is performed in an inert atmosphere and a reduced pressure atmosphere, it takes a very long time. In addition, since the degreasing temperature is not so high, the formed body is hardly oxidized even when it is performed in the air atmosphere. Therefore, in consideration of the balance between production efficiency and quality, it is preferable to perform the degreasing step in an air atmosphere.

By subjecting the formed body after drying or the formed body after degreasing to firing under an inert atmosphere using the the continuous furnace described above, a ceramic product containing silicon carbide is manufactured. When the formed body after drying is fired in the above-described continuous furnace, the degreasing step and the firing step can be performed together in the continuous furnace.

The methods for firing includes, but are not limited to, reaction sintering, recrystallization sintering, reduced pressure Si impregnation, normal pressure Si impregnation, and Si-bonded SiC. The reaction sintering refers to a firing method in which a formed body made of SiC and C is impregnated with molten Si to obtain SiC by a reaction between C and Si. The recrystallization sintering refers to a firing method in which SiC particles formed at a high density are sintered at a high temperature of 2000° C. or higher. The reduced pressure Si impregnation refers to a firing method in which metallic silicon is impregnated under reduced pressure. The normal pressure Si impregnation refers to a firing method in which metallic silicon is impregnated under normal pressure. The Si-bonded SiC refers to a firing method in which a raw material mixture composed of SiC and Si is sintered to obtain a sintered body having a structure in which SiC is held by Si.

In order to sufficiently perform sintering, the firing temperature is preferably 1350° C. or higher, more preferably 1400° C. or higher, and even more preferably 1450° C. or higher. In order to suppress the manufacturing cost at the time of firing, the firing temperature is preferably 2200° C. or lower, more preferably 1800° C. or lower, and even more preferably 1600° C. or lower.

In order to sufficiently perform sintering, the heating time of the degreased body at the above-described firing temperature is preferably 0.25 hours or more, more preferably 0.5 hours or more, and even more preferably 0.75 hours or more. In order to suppress the manufacturing cost at the time of firing, the heating time of the degreased body at the above-described firing temperature is preferably 5 hours or less, more preferably 4 hours or less, and even more preferably 3 hours or less.

The porosity of the ceramic product containing silicon carbide is not particularly limited, but is preferably 45% or more, and more preferably 60% or more, from the viewpoint of a large antioxidation effect. However, from the viewpoint of mechanical strength, the porosity is preferably 75% or less, and more preferably 68% or less. In the present invention, the porosity refers to a value measured by the Archimedes Method.

The ceramic product containing silicon carbide according to the present invention can be used as various ceramic products such as a heat sink, an exhaust gas filter, a catalyst carrier, a sliding component, a nozzle, a heat exchanger, and a component for a semiconductor manufacturing apparatus.

EXAMPLES

Comparative Example 1

A plurality of honeycomb formed bodies was formed by extruding a green body containing silicon carbide, metallic silicon, a water-absorbing resin (pore-forming agent), an inorganic auxiliary, a methylcellulose (binder) and water. Each honeycomb formed bodies had a pillar-shaped honeycomb structure having an outer peripheral side wall and partition walls disposed inside the outer peripheral side wall, the partition walls defining a plurality of cells which form flow paths for a fluid from one end face to another end face of the pillar-shaped honeycomb structure.

After each honeycomb formed body was dried by high-frequency dielectric heating, it was dried at 120° C. for 2 hours using a hot air drier, and was processed as required by cutting both end faces with a predetermined length, and thereby a rectangular parallelepiped honeycomb dried body of height 45 mm×width 45 mm×length (in the cell extension direction) 140 mm was produced. Next, the honeycomb dried body was placed in a continuous electric furnace and degreased (removing binder) by heating at 450° C. or lower for 20 hours in an air atmosphere to obtain a honeycomb degreased body.

Next, a plurality of honeycomb degreased bodies was placed on a rectangular shelf plate (length 420 mm×width 390 mm) made of silicon carbide containing silicon nitride. The same shelf plate was repeatedly stacked in the up-down direction by interposing a silicon carbide frame body containing silicon nitride surrounding the outer periphery of the shelf plate to assemble a tower-shaped kiln tool having a total of 11 stages having a structure shown in FIG. 3. At this time, the number of the honeycomb degreased bodies mounted on one shelf plate was set to 16. The installation area of the honeycomb degreased body occupied 60% of the shelf plate area (area where the honeycomb degreased body could be placed) inside the side wall.

A continuous furnace having the structure shown in FIG. 1 was prepared. In the cooling zone of the continuous furnace, a plurality of through holes formed in the furnace wall and connecting the outside and inside of the furnace, and a plurality of cooling pipes inserted through these through holes were arranged in parallel in the furnace length direction. The airtightness was improved by triply fitting a heat resistant rope in the gap between the through holes and the cooling pipes. Further, in the heating zone of the continuous furnace, a plurality of through holes formed in the furnace wall and connecting the outside and inside of the furnace, and a plurality of of rod-shaped heaters inserted in these through holes were arranged in parallel in the furnace length direction. The airtightness was improved by triply fitting a heat resistant rope in the gap between the through hole and the rod-shaped heater.

Figure 2:
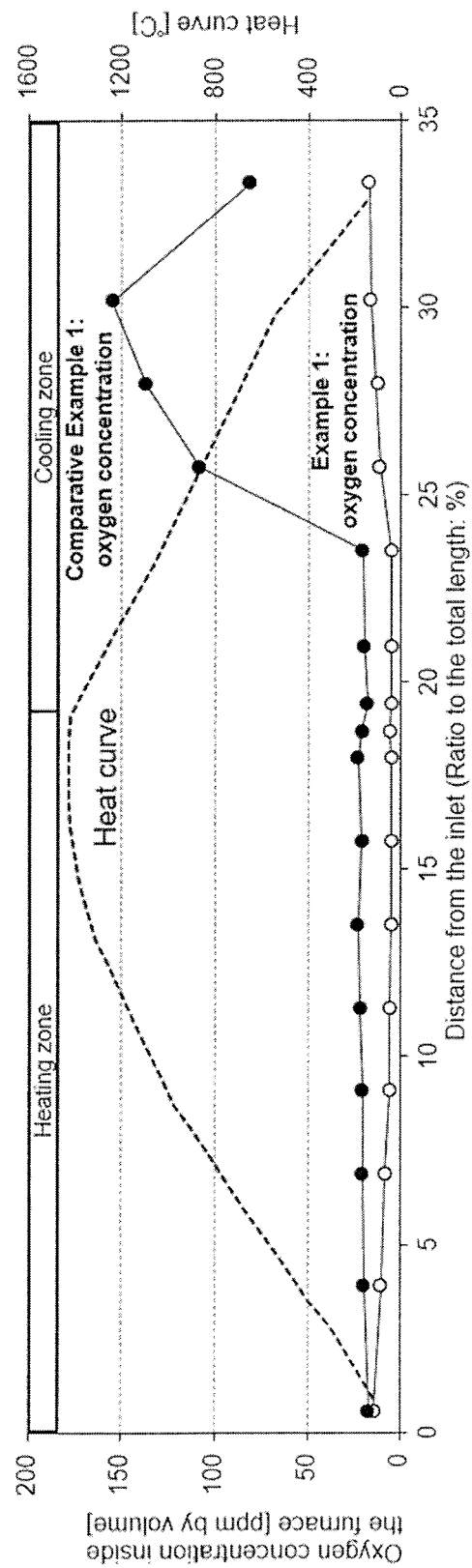
FIG. 2 is a graph showing a heat curve and an oxygen concentration distribution in the furnace in Example 1 and Comparative Example 1.

The kiln tool assembled above was placed on a base plate, and the base plate was pushed with a pusher to introduce the kiln tool into the continuous furnace from the inlet. After the base plate had been introduced into the furnace, an argon gas is supplied through the furnace at a flow rate of 1 Nm³/hr per 1 m³ of the furnace volume while the inlet and outlet doors of the continuous furnace are closed, so that the inside of the furnace was set to an argon atmosphere (inside furnace pressure=outside furnace pressure+10 Pa). Thereafter, the base plate was moved from the inlet to the outlet, and the honeycomb degreased body in the kiln tool was subjected to the firing according to the heat curve shown in Table 1 and FIG. 2. The base plate moved in the continuous furnace at a constant speed, and it took 30 hours from the inlet to reach the outlet of the continuous furnace. In addition, the argon gas was kept flown into the furnace at the above-described flow rate throughout the time when the base plate was passing through the furnace.

<Oxygen Concentration Measurement>

When the base plate passed through the continuous furnace, the oxygen concentration was measured using a galvanic cell type oxygen concentration meter (product name: oxy.IQ by GE Sensing & Inspection Technologies Co. Ltd.) at a plurality of points over the entire length of the furnace. The results are shown in Table 1 and FIG. 2.

<Appearance Inspection>

Each honeycomb fired body after the firing was taken out of the kiln tool, and visually inspected for appearance inspection. As a result, many appearance abnormalities due to oxidation were observed in the honeycomb fired bodies placed near the outer periphery of the shelf plate. Among the honeycomb fired bodies placed in the kiln tool, the ratio of the number of the honeycomb fired bodies having appearance abnormalities (defective rate) was calculated to be 75%.

<Mechanical Strength>

In addition, when some honeycomb fired bodies with appearance abnormalities were palpated, they were brittle and easily chipped.

<Porosity>

For some of the honeycomb fired bodies having no appearance abnormalities, when the porosity of the partition walls was measured by the Archimedes Method, it was about 63%. Further, the porosity of some of the honeycomb fired bodies having appearance abnormalities was measured in the same manner and found to be about 65%.

Example 1

Upon the results of Comparative Example 1, the following inspection was performed. First, the inside of the furnace was set to an argon atmosphere (inside pressure of the furnace: 1003 hPa, outside pressure of the furnace: 1000 hPa), and while the inside of the furnace was heated so as to have a heat curve corresponding to the firing conditions, leak of argon gas from the furnace wall was inspected with a leak detector (manufactured by Restek Corporation, detection method: utilizing the difference in thermal conductivity with air). The leak detector was able to detect argon of $1.0 \times 10^{-4}$ atm·cc/sec or more. Inspection by the leak detector was performed at all locations where there were components inserted in through holes formed on the furnace wall and connecting the outside of the furnace and the inside of the furnace (including indirect cooling pipes for flowing air and electric-heating rod-shaped heaters). The joint locations between the ceiling lid and the furnace body were also inspected with the leak detector. In addition, the joint locations where the argon gas in the furnace body might leak out were inspected by the leak detector.

With the leak detector, many leaks of argon gas were detected in the gaps between the through holes and the rod-shaped heaters and in the gaps between the through holes and the cooling pipes. Therefore, in order to prevent air from outside the furnace from flowing into the furnace at the leakage locations, a single rubber ring made of fluoro rubber was additionally fitted outside the heat resistant rope in the gap between the through hole and the rod-shaped heater (see FIG. 5). Similarly, a single rubber ring made of fluoro rubber was additionally fitted outside the heat resistant rope in the gap between the through hole and the cooling pipe (see FIG. 4). In addition, as a result of the inspection using the leak detector, the airtightness was also enhanced by applying a silicone sealant to joint locations between the ceiling lid and the furnace body where leakage of argon gas was detected.

Under the same conditions as in Comparative Example 1 except that the continuous furnace having the improved airtightness was used in this manner, a plurality of honeycomb degreased bodies placed on the shelf plates in the kiln tool were subjected to firing. At this time, the oxygen concentration was measured in the same manner as in Comparative Example 1. The results are shown in Table 1 and FIG. 2.

<Appearance Inspection>

When the appearance inspection of the obtained honeycomb fired body was performed in the same manner as in Comparative Example 1, the defective rate was 0%.

<Mechanical Strength>

In addition, when the honeycomb fired bodies near the center of the shelf plate and the honeycomb fired bodies near the outer periphery of the shelf plate were palpated, no significant difference in mechanical strength was found between the two.

<Porosity Measurement>

For the honeycomb fired bodies near the center of the shelf plate and the honeycomb fired bodies near the outer periphery of the shelf plate, the porosity of the partition walls was measured by the Archimedes Method. Both were about 63%, no significant difference was found between the two.

TABLE 1

| | | Heating zone | | | | | | | | |
|---|---|---|---|---|---|---|---|---|---|---|
| | Measuring port No. | 1 | 2 | 3 | 4 | 5 | 6 | 7 | 8 | 9 |
| | Distance from the inlet (Ratio to the total length: %) | 1.6 | 11.1 | 19.6 | 25.9 | 32.3 | 38.6 | 45.0 | 51.3 | 53.4 |
| | Temperature inside the furnace(° C.) | 120 | 485 | 730 | 1030 | 1145 | 1350 | 1400 | 1430 | 1430 |
| Comparative Example 1 | Oxygen concentration (ppm by volume) | 17 | 19 | 20 | 20 | 22 | 23 | 21 | 23 | 21 |
| Example 1 | Oxygen concentration (ppm by volume) | 14 | 10 | 8 | 6 | 6 | 5 | 5 | 5 | 6 |

| | | Cooling Zone | | | | | | |
|---|---|---|---|---|---|---|---|---|
| | Measuring port No. | 10 | 11 | 12 | 13 | 14 | 15 | 16 |
| | Distance from the inlet (Ratio to the total length: %) | 55.5 | 59.8 | 67.2 | 73.5 | 79.8 | 86.2 | 95.2 |
| | Temperature inside the furnace(° C.) | 1390 | 1300 | 1025 | 700 | 530 | 400 | 70 |
| Comparative Example 1 | Oxygen concentration (ppm by volume) | 18 | 19 | 20 | 108 | 137 | 155 | 81 |
| Example 1 | Oxygen concentration (ppm by volume) | 5 | 5 | 5 | 11 | 13 | 16 | 17 |

Example 2

Except that the flow rate of the argon gas flowing into the furnace was set to 0.5 Nm$^3$/hr per 1 m$^3$ of the furnace volume, the firing of a plurality of honeycomb degreased bodies placed on the shelf plates in the kiln tool under the same conditions as in Example 1 was performed. As a result, about the same oxygen concentration distribution inside the furnace as in Example 1 was obtained. In addition, when appearance inspection of the obtained honeycomb fired bodies was performed in the same manner as in Comparative Example 1, the defective rate was 0%.

<Mechanical Strength>

In addition, when the honeycomb fired bodies near the center of the shelf plate and the honeycomb fired bodies near the outer periphery of the shelf plate were palpated, no significant difference in mechanical strength was found between the two.

<Average Pore Diameter Measurement>

For the honeycomb fired bodies near the center of the shelf plate and the honeycomb fired bodies near the outer periphery of the shelf plate, several average pore diameters of the partition walls were measured by a mercury intrusion method, and both were about 20 μm. No significant difference was found between the two.

DESCRIPTION OF REFERENCE NUMERALS

10 Continuous furnace
11 Inlet
12 Heating zone
13 Cooling zone
14 Outlet
15 Base plate
16 Cooler
17 Heater
19 Pusher
20 Inert gas supply port
21 Inert gas discharge port
30 Kiln tool
31 Work
32 Base plate
33 Shelf plate
33a Shelf plate surface (upper surface)
34 Frame body
34a Frame body upper surface
35 Top plate
39 Notch
41 Furnace wall
42 Rubber ring
43 Cooling pipe
44 Through hole
45 Heat resistant rope
51 Furnace wall
52 Heat resistant rubber ring
53 Rod-shaped heater
54 Through hole
55 Heat resistant rope
56 Insulant
57 Can body

The invention claimed is:

1. A method for manufacturing a ceramic product containing silicon carbide, comprising a step of firing a formed body of a green body containing silicon carbide by transporting the formed body from an inlet to an outlet of a continuous furnace, wherein the continuous furnace comprises the inlet, a heating zone, a cooling zone, and the outlet in this order, and a furnace atmosphere in both the entire heating zone and the entire cooling zone is an inert gas having an oxygen concentration of 1 ppm by volume or more and 100 ppm by volume or less,
   wherein the cooling zone refers to a range in a traveling direction of the formed body from immediately after a heater provided closest to the outlet to the outlet of the continuous furnace, and the formed body is cooled to at least 530° C. in the cooling zone.

2. The method for manufacturing a ceramic product containing silicon carbide according to claim 1, wherein a flow rate of the inert gas supplied to the continuous furnace is 1 Nm$^3$/hr or less per 1 m$^3$ of a furnace volume.

3. The method for manufacturing a ceramic product containing silicon carbide according to claim 1, wherein the cooling zone comprises
at least one through hole formed in a furnace wall and connecting an outside of the furnace and an inside of the furnace; and
at least one cooling pipe inserted into the through hole, a gap between the through hole and the cooling pipe being sealed by at least one rubber ring.

4. The method for manufacturing a ceramic product containing silicon carbide according to claim 3, wherein the rubber ring is made of fluoro rubber or silicone rubber.

5. The method for manufacturing a ceramic product containing silicon carbide according to claim 1, wherein the heating zone comprises
at least one through hole formed in a furnace wall and connecting an outside of the furnace and an inside of the furnace and
at least one rod-shaped heater inserted into the through hole, a gap between the through hole and the rod-shaped heater being sealed by at least one rubber ring.

6. The method for manufacturing a ceramic product containing silicon carbide according to claim 1, wherein the formed body of the green body further comprises silicon.

7. The method for manufacturing a ceramic product containing silicon carbide according to claim 1, wherein the formed body of the green body comprises a pillar-shaped honeycomb structure having an outer peripheral side wall and partition walls disposed inside the outer peripheral side wall, the partition walls defining a plurality of cells which form flow paths for a fluid from one end face to another end face of the pillar-shaped honeycomb structure.

8. The method for manufacturing a ceramic product containing silicon carbide according to claim 1, wherein a porosity of the ceramic product containing silicon carbide is 45% or more.

9. The method for manufacturing a ceramic product containing silicon carbide according to claim 1, wherein a furnace pressure in the heating zone and the cooling zone is higher than an atmospheric pressure outside the furnace.

10. The method for manufacturing a ceramic product containing silicon carbide according to claim 1, wherein the oxygen concentration of the inert gas is 3 ppm by volume or more and 100 ppm by volume or less.

11. The method for manufacturing a ceramic product containing silicon carbide according to claim 1, wherein the oxygen concentration of the inert gas is 5 ppm by volume or more and 100 ppm by volume or less.

12. A sealing method for reducing an oxygen concentration in a furnace, comprising:
preliminarily, a step of inspecting a leak of an inert gas in a continuous furnace from a furnace wall with a leak detector, and when the leak of the inert gas is detected by the leak detector, a step of performing a seal to prevent air from an outside of the furnace from flowing into an inside of the furnace at a leak location; and
thereafter, performing a method for manufacturing a ceramic product containing silicon carbide, comprising a step of firing a formed body of a green body containing silicon carbide by transporting the formed body from an inlet to an outlet of the continuous furnace, wherein the continuous furnace comprises the inlet, a heating zone, a cooling zone, and the outlet in this order, and a furnace atmosphere in both the entire heating zone and the entire cooling zone is an inert gas having an oxygen concentration of 1 ppm by volume or more and 100 ppm by volume or less,
wherein the cooling zone refers to a range in a traveling direction of the formed body from immediately after a heater provided closest to the outlet to the outlet of the continuous furnace, and the formed body is cooled to at least 530° C. in the cooling zone, and
wherein the step of inspecting the leak of the inert gas in the furnace from the furnace wall with the leak detector is at least performed on a location where there is a component inserted into a through hole formed on the furnace wall and connecting the outside and inside of the furnace in the cooling zone.

13. The sealing method for reducing an oxygen concentration in a furnace according to claim 12, wherein the step of inspecting the leak of the inert gas in the furnace from the furnace wall with the leak detector is also performed on a location where there is a component inserted into a through hole formed on the furnace wall and connecting the outside and inside of the furnace in the heating zone.

14. The sealing method for reducing an oxygen concentration in a furnace according to claim 12, wherein the step of performing the seal comprises using a rubber ring.

* * * * *